June 9, 1953 J. W. WENTWORTH 2,641,643

COLOR TELEVISION CAMERA

Filed Dec. 1, 1950

INVENTOR
John W. Wentworth
BY
Olin D. Mitchell
ATTORNEY

Patented June 9, 1953 2,641,643

UNITED STATES PATENT OFFICE 2,641,643

COLOR TELEVISION CAMERA

John W. Wentworth, Haddonfield, N. J., assignor to Radio Corporation of America, a corporation of Delaware Application December 1, 1950, Serial No. 198,532

1 Claim. (Cl. 178—5.4)

Figure 1:
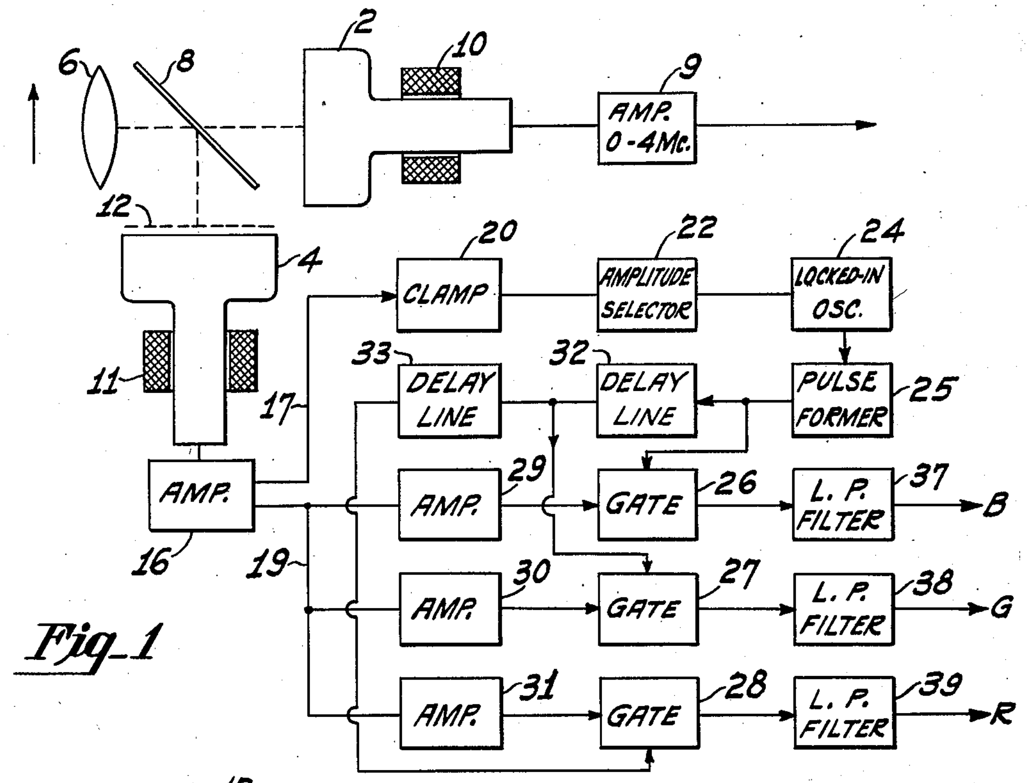

This invention relates to improvements in color television cameras whereby a high degree of registration is not required and wherein the various functions are performed with a minimum number of pick-up tubes.

A system of color television has been developed in which the transmitted signal consists of a high-definition brightness signal (directly comparable to an ordinary black-and-white television signal) with a low-definition chromaticity signal superimposed on it in the form of modulation of a frequency-interlaced sub-carrier. The brightness signal represents the sum of the brightnesses of the green, red, and blue components of the televised scene. The chromaticity signal is obtained by applying simultaneous signals representing the intensities of the green, red, and blue components of the scene to a three-phase modulator connected in such a way that the output signal of the modulator has an amplitude corresponding to saturation and an instantaneous phase corresponding to hue. The chromaticity signal may have a much narrower band width than the brightness signal because the human eye does not see detail in color as well as it sees detail in black-and-white.

In the prior art, color television cameras are disclosed wherein separate pick-up tubes are employed to derive the signals corresponding to the intensity of each of the component colors. In other systems, a single camera is employed to pick-up the brightness or black-and-white signal and two additional cameras are employed to derive the essential color information. However, when the latter type of camera is employed in a three-color system, it becomes necessary to subtract the color information from the black-and-white information, in order to derive a signal that is representative of the third color. In each of these systems, three pick-up tubes are therefore required.

In still other systems, cameras are disclosed in which an attempt is made to use a single pick-up tube and to obtain color separation by means of line or dot color filters either external or built into the tube itself. In such systems, adequate resolution is obtained only by using a very large number of lines or dots in the filters, and very rigid requirements for scanning linearity and stability are necessary.

It is an object of this invention to provide an improved color camera wherein the number of pick-up tubes employed is reduced, the normal stringent requirements for exact registration are greatly relaxed, and a strip type of filter with relatively few lines can be used for color separation without requiring extreme linearity and stability in the scanning circuits.

It is another object of this invention to provide an improved color television camera wherein the number of pick-up tubes employed is reduced and the normal stringent requirements for exact registration are greatly relaxed.

In accordance with this invention, however, the problem of registration is greatly minimized as the black-and-white information is derived by one pick-up tube and the color information is derived by another pick-up tube. Only two pick-up tubes are thus required regardless of the number of the component colors employed in the system.

Furthermore, the color information is limited to low frequency, so that any mis-registration occurring in the scanning of the two pick-up tubes merely displaces the color with respect to the detail of the image, but does not appreciably affect the detail.

Figure 2:
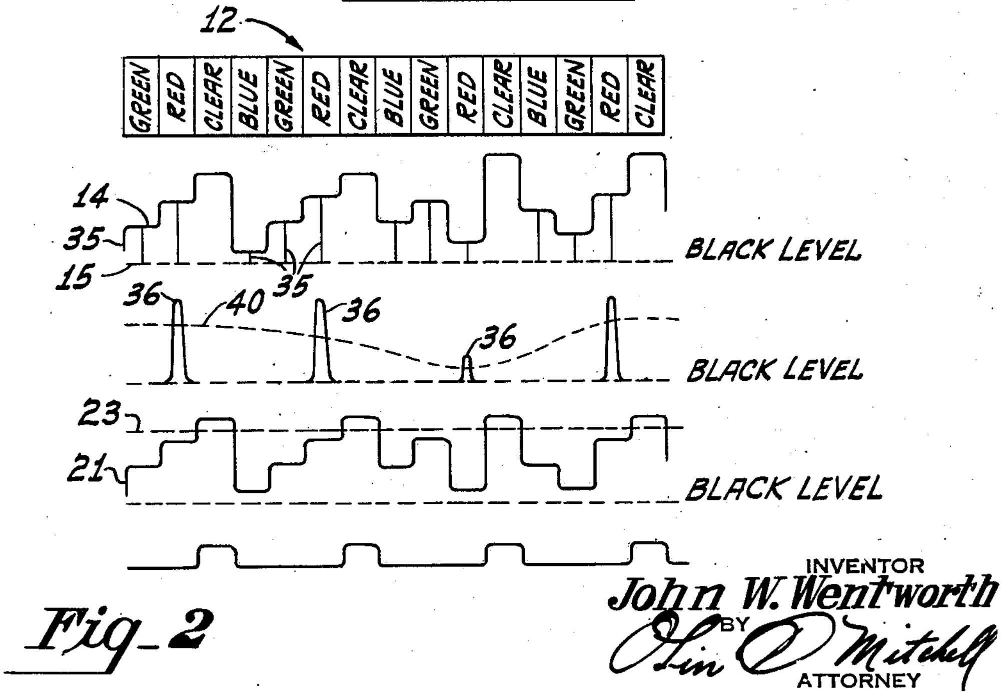

The way in which the above objectives may be obtained will be better understood from a detailed consideration of the drawings, in which:

Figure 1 illustrates in block diagram form a color television camera incorporating the features of this invention, and Figure 2 is a greatly enlarged view of a small section of a type of filter that may be employed in the color pick-up tube of Figure 1, as well as certain waveforms useful in the explanation of the operation of the invention.

Turning now to Figure 1, there is shown means for optically focusing an image to be televised onto the photo cathodes of two pick-up tubes 2 and 4 respectively. It may be comprised, as shown, of an objective lens 6 and a half-silvered mirror 8. As is well known to those skilled in the art, it is customary to place the pick-up tubes 2 and 4, so that their principal axes are perpendicular, the principal axis of one of them coinciding with the principal axis of the objective lens 6. The half-silvered mirror 8 is mounted at a 45° angle with reference to each of the principal axes as shown.

The pick-up tube 2 operates in a conventional manner to supply brightness signals, such as are used in present monochrome systems, to an amplifier 9. The pick-up tube 2 is of course equipped with means for projecting an electronic beam onto the photo cathode and deflection coils 10 for causing the beam to scan a raster on the target. For purposes of illustration, it will be assumed that the camera is to operate within the frequency limitations presently required in monochrome systems wherein approximately four megacycles of video information are available. In accordance with the dot multiplex system discussed previously above, the detail information is to take up the whole video band. Therefore, the amplifier 9 passes signals up to four megacycles. The output of the amplifier 9 is connected to the shunted-monochrome input of a conventional transmitting sampler.

The information as to chromaticity is derived by the pick-up tube 4. As is conventional, this tube is provided with an electron gun or other means for projecting a beam of electrons toward a target and deflection coils 11 adapted to cause the electron beam to scan a raster on the target. Between the photo cathode of the pick-up tube 4 and the half-silvered mirror 8, there is placed a series of line filters, such as generally indicated by the numeral 12 in Figure 2. Assuming that this is a three-color system, the first strip in a sequence may transmit only blue light, a second strip only green light, and a third strip only red light. In between each of these sequences, there is positioned a clear filter that is a neutral filter capable of transmitting all the various colors of light. The filter 12 is preferably an integral part of the tube in order that it may be mounted as close to the photo cathode of the pick-up tube 4 as possible.

The filter 12 is positioned so that these line strips are substantially perpendicular to the direction followed by the beam as it scans its raster. Thus the signals derived by the beam and present at the output circuit of the pick-up tube 4 successively represent the intensities of the light transmitted by the blue, green, red, and clear line or strip filters.

The actual number of strips in the line filter 12 is determined by the resolution desired from the color channels. The number of picture elements of each color across any line can be no greater than the number of strips of that color in the line filter. This number may be as low as fifty (corresponding to a resolution of 0.5 mc.) to give commercially acceptable pictures, while the upper limit depends on the accuracy with which strip filters can be made and the stability of associated circuits (filters of 100 or more lines of each color to the inch should be practical at the present state of the art).

A waveform 14 of Figure 2 illustrates the type of signal that may be produced at the output of the color tube 4, the dotted line 15 representing the black level. The waveform 14 is drawn in such a way with respect to the filter 12 that those portions of it appearing in vertical registry with the strips of filter 12 correspond to the amplitude of the signal generated as the beam in the pick-up tube 4 crosses that portion of its target upon which the image passing through the corresponding filter strip falls.

In view of the fact that all the component colors may pass with but very little reduction through the clear strips of light filter 12, the amplitude of the waveform 14 produced in response to this transmitted light is generally greater than the amplitude of signal produced in response to the different component colors of light that pass through the green, red, and blue strips respectively.

After being amplified in an amplifier 16, the signals, such as represented by the waveform 14, are applied to two separate output leads 17 and 19. The output lead 17 is connected to any conventional clamp circuit 20 adapted to clamp the waveform 14 to the peaks of the signals generated in response to the light transmitted by the clear strips as indicated in the waveform 21. A clamp circuit suitable for this purpose is illustrated in section 3–11 of Waveforms by Chance and others (McGraw-Hill, 1949). The output of the clamp circuit 20 is then applied to an amplitude selector 22 of conventional design, such as found in sec. 9–3 of Waveforms (op. cit.). Those portions of the clamped waveform 21 that exceed the clipping level indicated by the dotted line 23 are applied in conventional manner so as to control the frequency of an oscillator 24.

During a particular sequence of signals including a signal from each of the color strips and also from a clear strip, it is sometimes possible that the amplitude of the signals derived from the information passed by the clear strips may be less than one or more of the signals passed by the color strips. This is a generally unusual situation and, in order to prevent the frequency of the oscillator 24 from being unduly affected under such conditions, the time constant of the frequency control circuit can be made long enough, so as to include information from a plurality of the clear strips. In this way any errors introduced when the noise or other unusual effects causes the signals generated in response to the light passed by the clear strips to have a minimum amplitude in any given sequence may be averaged out.

The output of the oscillator 24 is applied to any conventional pulse forming circuit, such as may be found in sec. 9–3 of Waveforms (op. cit.). The pulses should be relatively narrow with respect to the duration of the signals produced in response to any one of the color strips. These pulses, as will be explained hereinafter, are to operate gating circuits so as to separate the signals corresponding to the light intensity passed by the differently colored line filters in the filter 12.

The signals, such as illustrated by the waveform 14 in Figure 2 are also applied, over the output lead 19, to a plurality of gating devices 26, 27, and 28, after being suitably amplified in amplifiers 29, 30, and 31. The pulses derived from the pulse forming circuit 25 are applied directly to the gate 26. After being delayed by a delay line 32, they are applied to the gate 27, and after being further delayed by another delay line 33, they are applied to the gate 28. Normally, the gates 26, 27, and 28 will not conduct the signals applied to them. In response to the pulses thus provided them, however, they are capable of passing the signals applied to them. In order to smooth out the pulses of color information, low-pass filters 37, 38, and 39 may be coupled to the outputs of the gates 26, 27, and 28 respectively.

By way of illustration, the red pulses passed by the gate 28, when the signals generated by the pick-up tube 4 correspond to the curve 14 in Figure 2, are indicated by the numeral 36. In order that a smooth output be derived from these pulses, they are passed through the low-pass filter 39, which provides a smooth output such as indicated by the dotted line 40 in Figure 2. In accordance with well established theory, the curve 40 exactly represents the average of the pulses 36 if the low-pass filter has a cut-off frequency that is one-half the frequency of the pulses 36.

The fact that no sampling control pulses appear while the scanning beam in the pick-up tube 4 is scanning a black area in the picture introduces no serious problem since during this time great accuracy in sampling is not necessary.

The overall operation of this particular embodiment of the invention is as follows. When the beam in the pick-up tube 4 generates a signal in response to light passed by the clear sections of the filter 12, a pulse is applied to control the frequency of the locked-in oscillator 24, so that it completes one cycle while the beam in the pick-up tube 4 is scanning one complete sequence of line filters, that is blue, green, red, and clear line filters. The phase of oscillator 24 is so adjusted that when the pulse generated by the pulse former 25 is applied to the gate 26 without any delay, it opens the gate 26 while the signals generated by the scanning beam in the pick-up tube 4 are representative of the intensity of the light passed by the blue filter. After passing through a suitable delay line 32, the pulse formed by the pulse former 25 is applied to the gate 27. Thus, the gate 27 is open when the signals generated by the beam in the pick-up tube 4 correspond to the intensity of the green light passed by the green line filters. Similarly, a further delay line 33 operates the gate 28, so that it permits passage of signals when the beam in the pick-up tube 4 generates signals corresponding to the red light passed by the red line filters. Thus, the signals passed by the clear strips initiate the sequential keying of the gates 26, 27, and 28, so as to permit the signals to be passed separately through them in accordance with the color represented by the particular signals. The operation of the gates is indicated by the vertical solid lines 35 between the black level 15 and the waveform 14 of Figure 2.

It was stated above that the camera incorporating the principles of this invention is most useful in connection with a dot multiplex color television system wherein the color information is sampled and the brightness information is passed around the sampler. No sampler has been shown in the drawings for this does not comprise a part of the camera. This is advantageous because the portion of the camera actually moved around within the studio need only be comprised of the two pick-up tubes 2 and 4, pre-amplifiers for their signal outputs, and the optical system comprised of lens 6 and the half-silvered mirror 8. The rest of the circuity, including the gates, filters and delay lines, can be located in the control room. Thus, the cables need only carry high voltage and scanning voltages to the cameras and only two output leads need return from the cameras. The possibility of doing this is of extreme importance when the practical operation of studio equipment is taken into account, because the cameramen have all they can do to keep the camera focused on the center of interest of the scene being televised. Thus, the more control that can be placed in the control room the better.

It is to be emphasized once again that the provisions of a single camera tube to pick up all the low-resolution chromaticity signals in combination with a pick-up tube producing the high detailed black-and-white information does not require a high degree of registration, and that the use of a line filter with a relatively small number of strips and with a clear strip between each series of green, red, and blue strips does not require a high degree of scanning linearity or stability.

Having thus described my invention, what is claimed is:

A color television camera comprising in combination a first pick-up tube and a second pick-up tube, said pick-up tubes having means for projecting a beam of electrons and means for causing said electrons to scan a raster, optical apparatus for focusing an image to be televised onto each of said pick-up tubes, means for causing the signals developed by the scanning action of the beam in said second pick-up tube to have an amplitude determined by the intensity of successive sequences of different component colors, means for supplying a signal between at least some of said sequences having an amplitude greater than any one of the signals in the adjacent sequence, a clamping circuit to which said signals are applied, an amplitude selecting circuit connected to the output of said clamping circuit, an oscillator, means for controlling the frequency of said oscillator in response to the output of said amplitude selecting circuit, a plurality of gate circuits adapted to receive said signals, a pulse forming circuit connected to the output of said oscillator and delay lines connected between said pulse forming circuit and each of said gates, the amount of delay being such that the gates are successively conductive in synchronism with the change in the component color represented by successive signals.

JOHN W. WENTWORTH.

References Cited in the file of this patent

UNITED STATES PATENTS

| Number | Name | Date |
|---|---|---|
| 2,492,926 | Valensi | Dec. 27, 1949 |
| 2,552,070 | Sziklai | May 8, 1951 |

FOREIGN PATENTS

| Number | Country | Date |
|---|---|---|
| 603,080 | Great Britain | June 9, 1948 |